United States Patent
Krishan et al.

(10) Patent No.: US 12,267,793 B2
(45) Date of Patent: Apr. 1, 2025

(54) METHODS, SYSTEMS, AND COMPUTER READABLE MEDIA FOR SYNCHRONIZATION OF POLICY DATA BETWEEN NETWORK FUNCTIONS IN TELECOMMUNICATIONS NETWORKS

(71) Applicant: Oracle International Corporation, Redwood Shores, CA (US)

(72) Inventors: Rajiv Krishan, Bangalore (IN); Sonal Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 349 days.

(21) Appl. No.: 17/748,793

(22) Filed: May 19, 2022

(65) Prior Publication Data
US 2023/0379845 A1    Nov. 23, 2023

(51) Int. Cl.
*H04J 3/06*        (2006.01)
*H04W 56/00*    (2009.01)
*H04W 80/12*    (2009.01)

(52) U.S. Cl.
CPC .......... *H04W 56/001* (2013.01); *H04W 80/12* (2013.01)

(58) Field of Classification Search
CPC ... H04W 56/001; H04W 80/12; H04W 80/20; H04L 43/08; H04L 67/02
See application file for complete search history.

(56) References Cited

U.S. PATENT DOCUMENTS

| 12,003,662 B2 * | 6/2024 | Garcia Azorero | ...... H04L 12/14 |
| 2011/0035594 A1 * | 2/2011 | Fox | .......... G06Q 30/02 713/170 |
| 2016/0191639 A1 * | 6/2016 | Dai | ....... H04L 67/306 709/204 |
| 2022/0014562 A1 * | 1/2022 | Garcia Azorero | .. H04L 41/5009 |

(Continued)

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

(Continued)

*Primary Examiner* — Abdelnabi O Musa
(74) *Attorney, Agent, or Firm* — Jenkins, Taylor & Hunt, P.A.

(57) ABSTRACT

Methods, systems, and computer readable media for synchronization of policy data between network functions in telecommunications networks. A method includes receiving, at a first network function in a telecommunications network, a subscription request from a second network function. The subscription request specifies a subscription for updates to policy data objects maintained by the first network function. The method includes sending a notification response to the second network function. The notification response includes, for each policy data object, a custom header including a respective entity tag for the policy data object. The method includes receiving a resource request from the second network function. The resource request specifies a first policy data object and includes a first entity tag for the first policy data object. The method includes sending a synchronization result to the second network function specifying whether or not the entity tag match.

20 Claims, 6 Drawing Sheets

(56) References Cited

U.S. PATENT DOCUMENTS

| | | | | |
|---|---|---|---|---|
| 2022/0191052 | A1* | 6/2022 | Garcia Azorero | H04L 12/14 |
| 2022/0200966 | A1* | 6/2022 | de-Gregorio-Rodriguez | |
| | | | | H04L 61/4511 |
| 2022/0272619 | A1* | 8/2022 | Garcia Azorero | H04W 4/08 |
| 2023/0171347 | A1* | 6/2023 | Garcia Azorero | H04W 4/24 |
| | | | | 455/432.1 |
| 2023/0171592 | A1* | 6/2023 | Han | H04W 8/20 |
| | | | | 370/328 |
| 2023/0232205 | A1* | 7/2023 | Long | H04W 8/20 |
| | | | | 455/418 |
| 2023/0361901 | A1* | 11/2023 | Kim | H04J 3/0667 |
| 2024/0056321 | A1* | 2/2024 | Xu | H04L 12/413 |
| 2024/0195795 | A1* | 6/2024 | Evans | H04L 9/3268 |

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

* cited by examiner

METHODS, SYSTEMS, AND COMPUTER READABLE MEDIA FOR SYNCHRONIZATION OF POLICY DATA BETWEEN NETWORK FUNCTIONS IN TELECOMMUNICATIONS NETWORKS

TECHNICAL FIELD

The subject matter described herein relates to telecommunications networks. More particularly, the subject matter described herein relates to methods, systems, and computer readable media for synchronization of policy data between network functions in telecommunications networks.

BACKGROUND

In fifth generation (5G) communications networks, the network node that provides service is referred to as a producer network function. A network node that consumes services is referred to as a consumer network function. A network function can be both a producer network function and a consumer network function depending on whether it is consuming or providing service. A given producer network function may include more than one network function instance.

Producer network functions register with a network function repository function (NRF). The NRF maintains service profiles of available network function instances identifying the services supported by each network function instance. Consumer network functions can subscribe to receive information about producer network function instances that have registered with the NRF.

Network functions can, in some cases, subscribe to other network functions for updates to shared data. For example, a policy control function (PCF) may subscribe to a unified data repository (UDR) for updates to policy data objects. The PCF and the UDR can then synchronize the policy data objects. Nonetheless, sometimes, the UDR may fail to deliver notification updates to the PCF.

Considering these and other difficulties, there exists a need for methods, systems, and computer readable media for synchronization of policy data between network functions in telecommunications networks.

SUMMARY

Methods, systems, and computer readable media for synchronization of policy data between network functions in telecommunications networks. A method includes receiving, at a first network function in a telecommunications network, a subscription request from a second network function, wherein the subscription request specifies a subscription for updates to a plurality of policy data objects maintained by the first network function; sending, at the first network function, a notification response to the second network function, wherein the notification response includes, for each policy data object of the plurality of policy data objects maintained by the first network function, a custom header including a respective entity tag for the policy data object; receiving, at the first network function, a resource request from the second network function, wherein the resource request specifies a first policy data object and includes a first entity tag for the first policy data object; and sending, at the first network function, a synchronization result to the second network function, wherein the synchronization result specifies whether the first entity tag for the first policy data object matches a stored entity tag for the first policy data object stored at the first network function.

According to another aspect of the subject matter described herein, the first network function is a unified data repository (UDR) and the second network function is a policy control function (PCF).

According to another aspect of the subject matter described herein, the plurality of policy data objects includes one or more of: AmPolicyData, SmPolicyData, and UsageMonData.

According to another aspect of the subject matter described herein, the resource request from the second network function comprises a hypertext transfer protocol (HTTP) GET request with If-None-Match set to the first entity tag for the first policy data object.

According to another aspect of the subject matter described herein, sending the synchronization result to the second network function comprises: comparing the first entity tag for the first policy data object with the stored entity tag for the first policy data object stored at the first network function; if the first entity tag for the first policy data object matches the stored entity tag for the first policy data object stored at the first network function, sending the synchronization result to indicate that the first policy data object has not been modified; and if the first entity tag for the first policy data object does not match the stored entity tag for the first policy data object stored at the first network function, sending the synchronization result to indicate that the first policy data object has been modified and sending the stored entity tag to the second network function.

According to another aspect of the subject matter described herein, the method includes, at the first network function, determining that one or more of the policy data objects maintained by the first network function have changed at the first network function and, in response, sending a notification message to the second network function, wherein the notification message includes, for each of the one or more policy data objects that have changed at the first network function, a respective updated entity tag.

According to another aspect of the subject matter described herein, the method includes, at the first network function, receiving an update message from the second network function, wherein the update message specifies a new value for at least one of the policy data objects, and wherein the method comprises, at the first network function, sending a notification message to the second network function, wherein the notification message includes, for each of the at least one of the policy data objects, an updated entity tag.

According to another aspect of the subject matter described herein, a system for synchronization of policy data between network functions in telecommunications networks comprises at least one processor and memory storing executable instructions for the at least one processor. The system includes a first network function in a telecommunications network. The first network function is implemented on the at least one processor and memory. The first network function is configured for: receiving a subscription request from a second network function, wherein the subscription request specifies a subscription for updates to a plurality of policy data objects maintained by the first network function; sending a notification response to the second network function, wherein the notification response includes, for each policy data object of the plurality of policy data objects maintained by the first network function, a custom header including a respective entity tag for the policy data object; receiving a resource request from the second network function, wherein the resource request specifies a first policy data object and includes a first entity tag for the first policy data object; and sending a synchronization result to the second network function, wherein the synchronization result specifies whether the first entity tag for the first policy data object matches a stored entity tag for the first policy data object stored at the first network function.

According to another aspect of the subject matter described herein, the first network function is a unified data repository (UDR) and the second network function is a policy control function (PCF).

According to another aspect of the subject matter described herein, the plurality of policy data objects includes one or more of: AmPolicyData, SmPolicyData, and UsageMonData.

According to another aspect of the subject matter described herein, the resource request from the second network function comprises a hypertext transfer protocol (HTTP) GET request with If-None-Match set to the first entity tag for the first policy data object.

According to another aspect of the subject matter described herein, sending the synchronization result to the second network function comprises: comparing the first entity tag for the first policy data object with the stored entity tag for the first policy data object stored at the first network function; if the first entity tag for the first policy data object matches the stored entity tag for the first policy data object stored at the first network function, sending the synchronization result to indicate that the first policy data object has not been modified; and if the first entity tag for the first policy data object does not match the stored entity tag for the first policy data object stored at the first network function, sending the synchronization result to indicate that the first policy data object has been modified and sending the stored entity tag to the second network function.

According to another aspect of the subject matter described herein, the first network function is configured for determining that one or more of the policy data objects maintained by the first network function have changed at the first network function and, in response, sending a notification message to the second network function, wherein the notification message includes, for each of the one or more policy data objects that have changed at the first network function, a respective updated entity tag.

According to another aspect of the subject matter described herein, the first network function is configured for: receiving an update message from the second network function, wherein the update message specifies a new value for at least one of the policy data objects; and sending a notification message to the second network function, wherein the notification message includes, for each of the at least one of the policy data objects, an updated entity tag.

According to another aspect of the subject matter described herein, one or more non-transitory computer readable media have stored thereon executable instructions that when executed by at least one processor of a computer cause the computer to perform steps comprising receiving, at a first network function in a telecommunications network, a subscription request from a second network function, wherein the subscription request specifies a subscription for updates to a plurality of policy data objects maintained by the first network function; sending, at the first network function, a notification response to the second network function, wherein the notification response includes, for each policy data object of the plurality of policy data objects maintained by the first network function, a custom header including a respective entity tag for the policy data object; receiving, at the first network function, a resource request from the second network function, wherein the resource request specifies a first policy data object and includes a first entity tag for the first policy data object; and sending, at the first network function, a synchronization result to the second network function, wherein the synchronization result specifies whether the first entity tag for the first policy data object matches a stored entity tag for the first policy data object stored at the first network function.

According to another aspect of the subject matter described herein, the first network function is a unified data repository (UDR) and the second network function is a policy control function (PCF).

According to another aspect of the subject matter described herein, the plurality of policy data objects includes one or more of: AmPolicyData, SmPolicyData, and UsageMonData.

According to another aspect of the subject matter described herein, the resource request from the second network function comprises a hypertext transfer protocol (HTTP) GET request with If-None-Match set to the first entity tag for the first policy data object.

According to another aspect of the subject matter described herein, sending the synchronization result to the second network function comprises: comparing the first entity tag for the first policy data object with the stored entity tag for the first policy data object stored at the first network function; if the first entity tag for the first policy data object matches the stored entity tag for the first policy data object stored at the first network function, sending the synchronization result to indicate that the first policy data object has not been modified; and if the first entity tag for the first policy data object does not match the stored entity tag for the first policy data object stored at the first network function, sending the synchronization result to indicate that the first policy data object has been modified and sending the stored entity tag to the second network function.

According to another aspect of the subject matter described herein, the steps include, at the first network function, determining that one or more of the policy data objects maintained by the first network function have changed at the first network function and, in response, sending a notification message to the second network function, wherein the notification message includes, for each of the one or more policy data objects that have changed at the first network function, a respective updated entity tag.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for synchronization of policy data between network functions in telecommunications networks.

Network functions can, in some cases, rely on policy data being synchronized with other network functions for normal operation of the telecommunications network. For example, a policy control function (PCF) can rely on a unified data repository (UDR) to get policy data for handing SM, AM, and UE sessions. If that data goes out of sync, the PCF may fail to enforce the right policies in the telecommunications network. This document describes solutions to allow the PCF to keep its policy data synchronized with the UDR using an adapted query model to save on processing and network bandwidth.

Although examples are provided below showing the PCF and the UDR, the solutions described in this document can be applied generally to any two network functions synchronizing their resources or other data objects.

Figure 1:
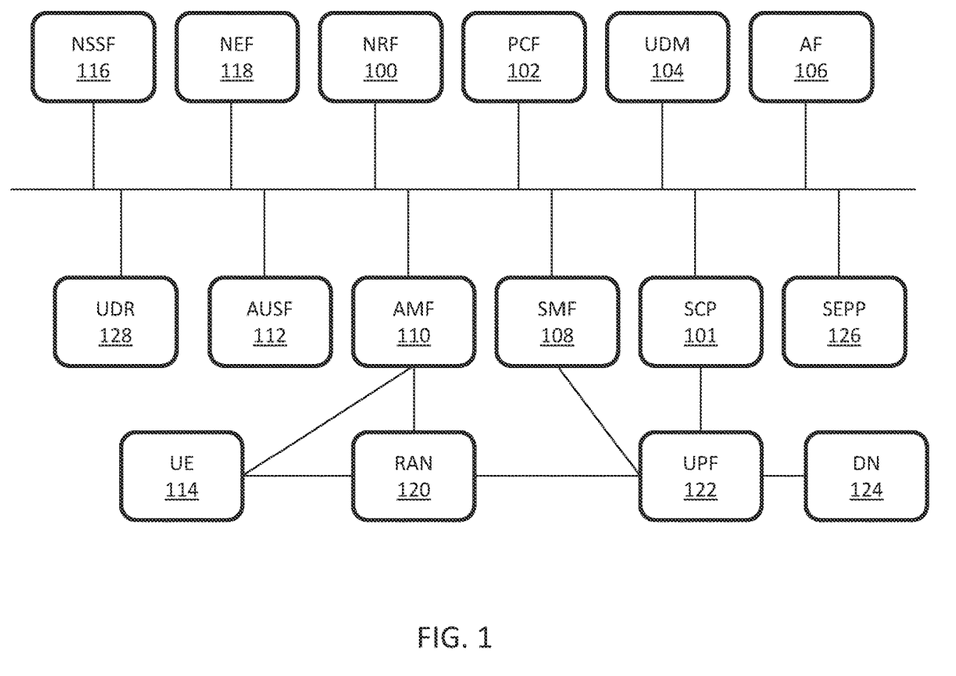
FIG. 1 is a block diagram illustrating an example 5G system network architecture.

FIG. 1 is a block diagram illustrating an example 5G system network architecture. The architecture in FIG. 1 includes network function repository function (NRF) 100 and service communication proxy (SCP) 101, which may be located in the same some public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP can obtain the NF or service profile or the producer NF instance from NRF 100. The NF or service profile can be a JavaScript object notation (JSON) data structure as defined in the $3^{rd}$ Generation Partnership Project (3GPP) Technical Specification (TS) 29.510.

In FIG. 1, network nodes can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. An authentication server function (AUSF) 112 performs authentication services for user equipment (UEs), such as user equipment (UE) 114, seeking access to the network.

AMF 110 performs mobility management operations similar to those performed by a mobility management entity (MME) in 4G networks. AMF 110 can perform, e.g., registration management, reachability management, connection management, and mobility management.

A network slice selection function (NSSF) 116 provides network slicing services for devices seeking to access specific network capabilities and characteristics associated with a network slice. Network slices enable users to select customized networks with different functionality (e.g., mobility) and/or performance requirements (e.g., latency, availability, reliability).

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 is the network node used to protect control plane traffic that is exchanged between different 5G public land mobile networks (PLMNs). As such, SEPP 126 performs message filtering, policing and topology hiding for application programming interface (API) messages.

SEPP 126 filters incoming traffic from another PLMN and performs topology hiding for traffic exiting the home PLMN. SEPP 126 may communicate with an SEPP in a visitor PLMN which manages security for the visitor PLMN. Thus, traffic between network functions in different PLMNs may traverse two SEPP functions, one for the home PLMN and the other for the visitor PLMN.

Unified data repository (UDR) 128 is a database that stores subscription-related data. In some examples, UDR 128 is implemented as a cloud native function that offers a unified database for storing application, subscription, authentication, service authorization, policy data, session binding and application state information. UDR 128 can expose a hypertext transfer protocol (HTTP) RESTful application programming interface (API) for network functions and provisioning clients to access the stored data. UDR 128 can register with NRF 100 so that other network functions in the network can discover UDR 128 through NRF 100.

3GPP TS 29.500 describes HTTP standard headers for using entity tags. An entity tag (ETag) is an HTTP header that can be used for cache validation and conditional requests from network functions for resources. The ETag response header is an identifier for a specific version of a resource that can enable more efficient caches, as a network function does not need to send a full response if the content has not changed.

In general, an ETag is assigned by a network function to a specific version of a resource found at a resource locator, e.g., a uniform resource locator (URL). If the resource representation at that URL changes, a new and different ETag is assigned.

ETags can be generated using any appropriate method for generating resource identifiers. For example, an ETag can be generated using a collision-resistant hash function of the resource's content, a hash of the last modification timestamp, or a revision number. In general, the method for generating ETags generates unique ETags or ETags that are sufficiently distinguished from one another that duplication of ETags would be rare.

ETags can be validated using any appropriate method for comparing ETags and determining matches between ETags. A strong match indicates that the content of the two resource representations is identical, whereas a weak match indicates that the two representations are semantically equivalent, such that they are not identical but are interchangeable and that cached copies can be used.

3GPP TS 29.500 describes the following HTTP headers:
Request header
  If-None-Match
    This header may be used in a conditional GET request. This is used in conjunction with the ETag server response header, to fetch content only if the tag value of the resource on the server differs from the tag value in the If-None-Match header.
Response header
  Etag
    This header may be sent to allow for conditional GET with the If-If-None-Match header or a conditional POST/PUT/PATCH/DELETE with the If-Match header.

PCF 102 is configured to handle various policy data objects. In response to creating or update a request, e.g., a request from SMF 108 or AMF 110, PCF 102 pulls subscriber data (e.g., smPolicyData, amPolicyData, usageMonData, and the like) and operator profile data from UDR 128. PCF 102 can also subscribe for any changes in subscriber or operator profiles at UDR 128. When PCF 102 is subscribed, UDR 128 notifies PCF 102 of any changes for the monitored resources, i.e., the policy data objects specified by the subscription request. The monitored resources can be changed, for example, by NEF 118 updates, operator updates, an alternative PCF instance making an update, and the like. PCF 102 may update some of the monitored resources, for example, with usagemonitoring and the like during a session or operatorSpecificData object at termination of a session.

Using this subscription model, PCF 102 can synchronize policy data objects with UDR 128. Occasionally, problems may arise with the synchronization of policy data objects. Consider the following two possible issues.

Problem 1: At some time, UDR 128 may fail to deliver a notification to PCF 102 when a monitored resource is changed. This will leave PCF 102 un-aware of the update at UDR 128. UDR 128 may fail to deliver the notification, e.g., due to a network overload or a software error or any other type of issue.

To ensure that PCF 102 has not missed any updates at UDR 128, PCF 102 can be configured to send regular (e.g., at certain time intervals) queries to UDR 128 to ensure that the policy data objects are in-sync at UDR 128 and PCF 102.

These queries from PCF 102 may lead to a waste of compute resources at UDR 128 and PCF 102 to fetch the profile, transfer the data, compare the change in profile and apply the change. Also, network resources may be wasted due to un-necessary data transfer between UDR 128 and PCF 102.

Problem 2: When a given AM/SM session terminates, PCF 102 will typically clean the profile data retrieved from UDR 128. Upon next session creation, PCF 102 pulls the complete data again and can subscribe again for further updates at UDR 128.

PCF 102 may opt for a quick cleanup of profile data, i.e., such that when the AM/SM/UE session terminates, PCF 102 may mark the UDR profile data to cleaned up by an audit process offline. This can help PCF 102 to be more proactive in handling calls by offloading data deletion.

However, upon next AM/SM/UE session, PCF 102 has to fetch the data again from UDR 128, even if data marked for cleanup is still available in a cache at PCF 102. Thus, fetching complete data from UDR 128 is again un-necessary if PCF 102 can validate that its cache is still valid and matches with the UDR dataset.

To solve these problems, this document describes methods, systems, and computer readable media for synchronization of policy data between network functions in telecommunications networks. A method includes receiving, at a first network function in a telecommunications network, a subscription request from a second network function. The subscription request specifies a subscription for updates to policy data objects maintained by the first network function. The method includes sending a notification response to the second network function. The notification response includes, for each policy data object, a custom header including a respective entity tag for the policy data object. The method includes receiving a resource request from the second network function. The resource request specifies a first policy data object and includes a first entity tag for the first policy data object. The method includes sending a synchronization result to the second network function specifying whether or not the entity tag match.

ETag is a standard header present and its purpose is well defined for request and response messages.

However, the scope of ETag is for a given URL resource, where a resource may change and the change may be notified to other network functions through alternate models, e.g., notification.

The solution described in this document can be implemented by:
  UDR 128 is configured to communicate ETag upon GET response or notification to multiple monitored objects.
  PCF 102 is configured to use ETag upon GET requests. This allows UDR 128 to provide the data, only if the respective resource has been modified, thereby conserving computing and network resources.
Regarding bundled objects:
  The subscription model with UDR 128 can be for bundled objects. For example, within 1 subscription, PCF 102 can subscribe for changes in multiple policy data objects, e.g., AmPolicyData, SmPolicyData, UsageMonData, and the like.

Thus, a single Etag value during notification cannot be used for exclusive GET operation on individual policy data objects.

To handle bundled policy data objects, UDR 128 can be configured to add custom headers with Etags for each monitoring object when sending notifications.

For example, when a notification contains SmPolicyData and UsageMonData, then UDR 128 adds "smpolicydata-etag" with an ETag value for SmPolicyData and "usagemondata-etag" with an Etag value for usage monitoring data.

FIGS. 2-5 show example message exchanges to illustrate the operation of this solution. The solution can have one or more of the following benefits compared to some conventional methods.

Saves network bandwidth and compute resources at UDR 128 and PCF 102:

With UDR 128 suppressing data in GET, when ETag matches it will help save network bandwidth.

Also, UDR 128 and PCF 102 will have effective compute resource utilization, when they quickly determine that requested profile data is in-sync between UDR 128 and PCF 102.

Backward compatible:

If UDR 128 does not support the proposed solution, then it will ignore ETag information from PCF 102 and always return data for GET operation.

If PCF 102 does not support the proposed solution, then it will send GET request without ETags and will always receive requested profile data.

Figure 2:
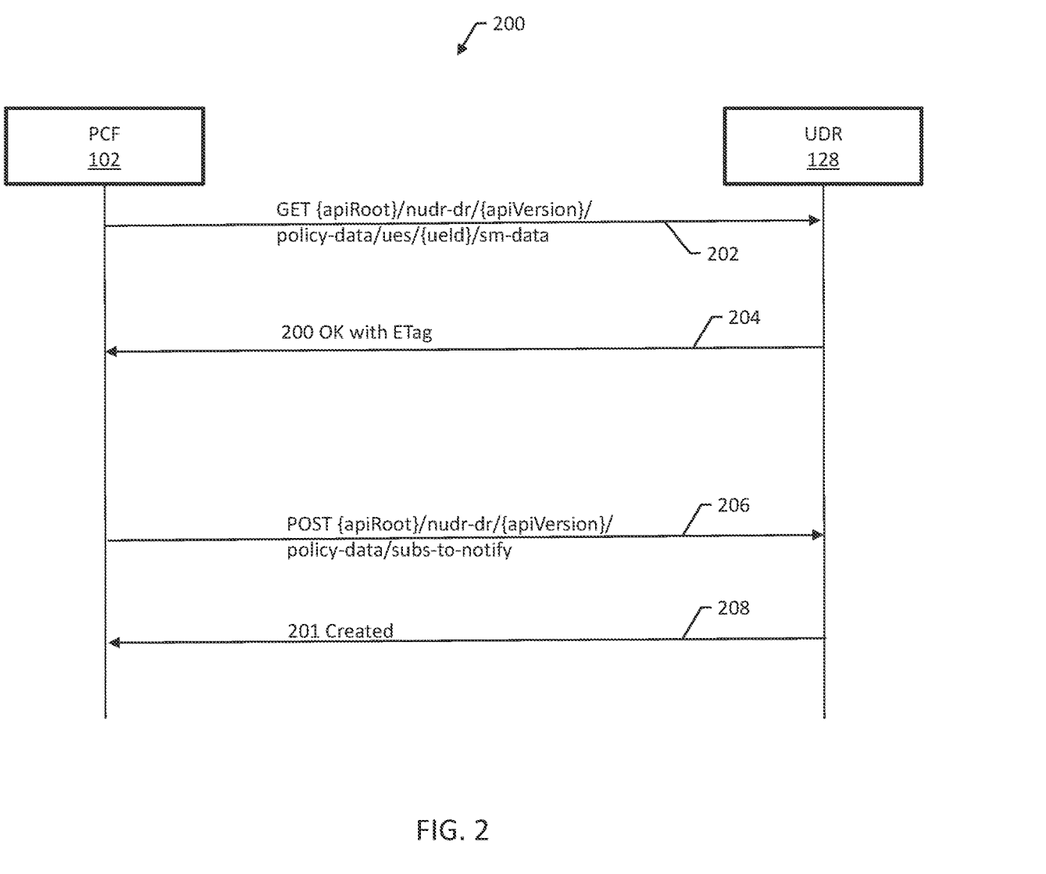
FIG. 2 is a ladder diagram illustrating an example message exchange for the PCF to subscribe to updates to policy data objects from the UDR.

FIG. 2 is a ladder diagram illustrating an example message exchange 200 for PCF 102 to subscribe to updates to policy data objects from UDR 128.

PCF 102 fetches SM data by sending a GET request message 202 to UDR 128. UDR 128 returns SM data in a response message 204 with an ETag value for the SM data. PCF 102 then stores the ETag along with the data. PCF 102 repeat the GET operation for other policy data objects, i.e., in this example, usageMonitoring and operatorSpecificData.

PCF 102 then subscribes for SM, usageMonitoring, and operatorSpecificData by sending a POST request message 206 to UDR 128. UDR 128 accepts the subscription and sends a response message 208 to confirm creation of the subscription. UDR 128 is then configured to send a notification to PCF 102 if any of the monitored resources changes at UDR 128.

Figure 3:
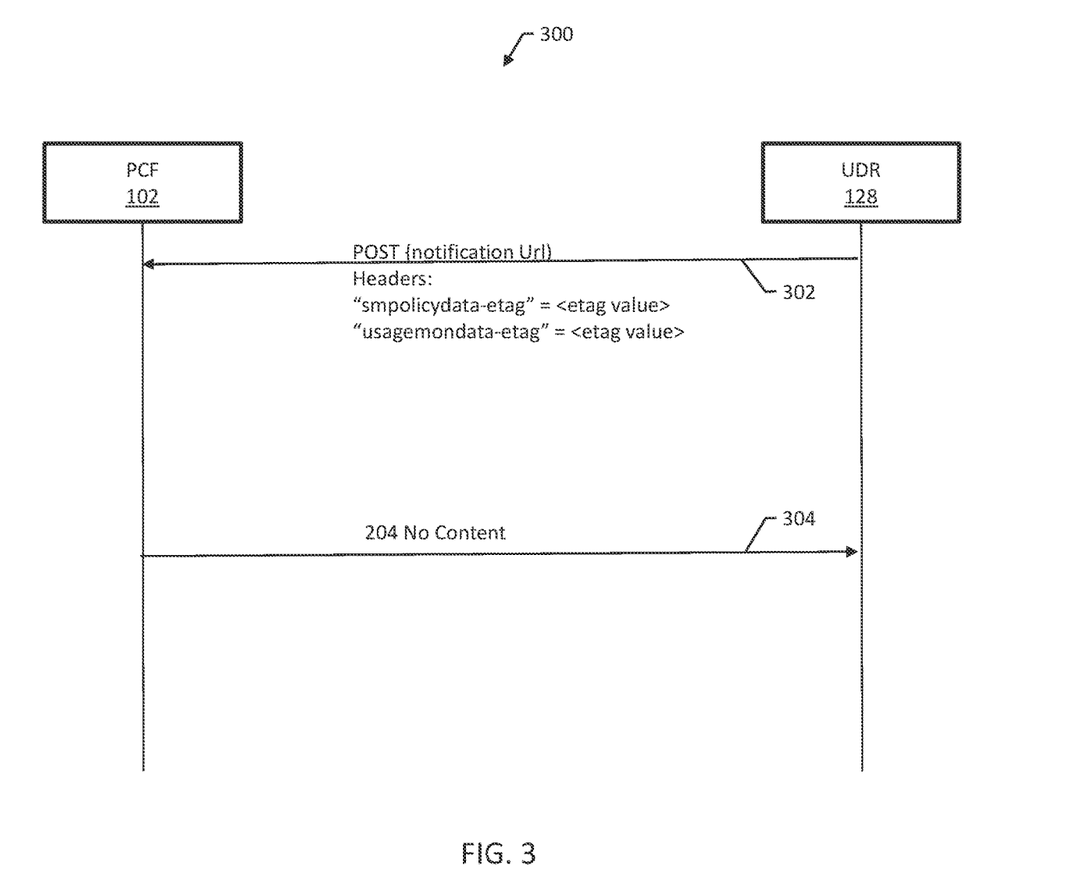
FIG. 3 is a ladder diagram illustrating an example message exchange for the UDR to notify the PCF of an update to subscribed policy data objects.

FIG. 3 is a ladder diagram illustrating an example message exchange 300 for UDR 128 to notify PCF 102 of an update to subscribed policy data objects.

Two policy data objects, smpolicy and usageMonitoring, are changed at UDR 128. UDR 128 creates a notification with custom headers for respective updated ETags for both smpolicy and usageMonitoring and sends the notification message 302 to PCF 102. PCF 102 stores the updated data and the updated ETags for each of the monitored policy data objects. PCF 102 then sends an acknowledgement message 304.

Figure 4:
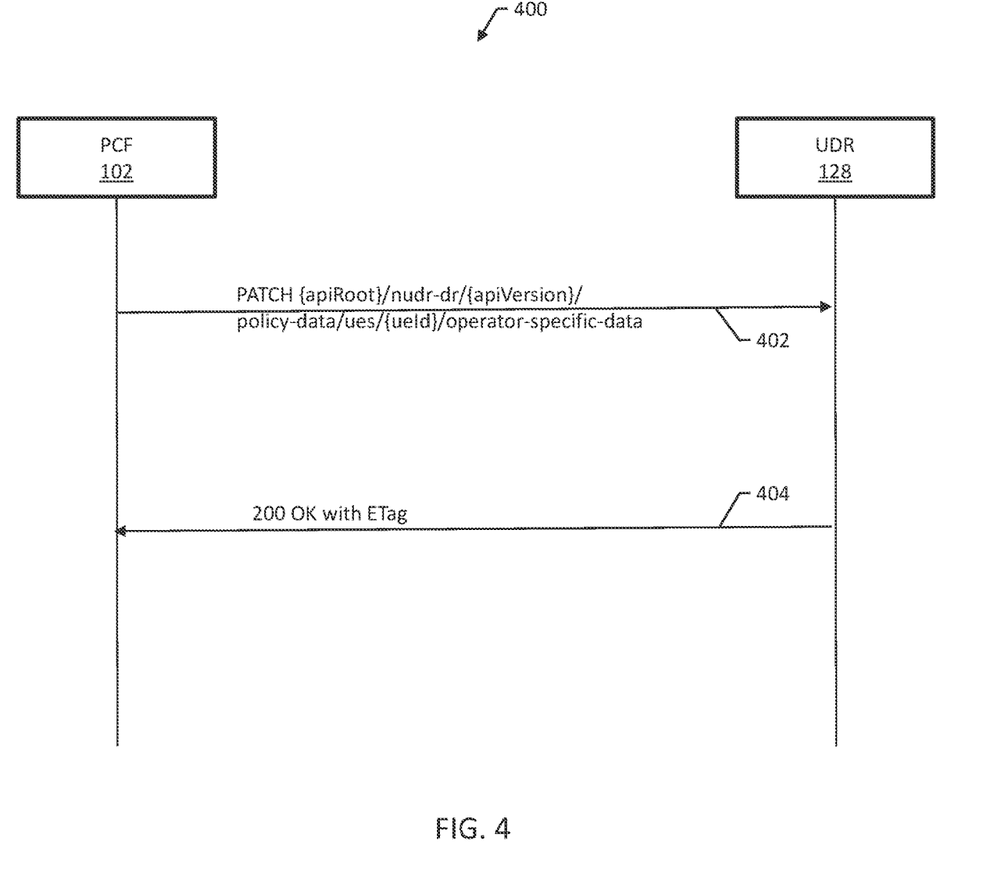
FIG. 4 is a ladder diagram illustrating an example message exchange for the PCF to update a policy data object at the UDR.

FIG. 4 is a ladder diagram illustrating an example message exchange 400 for PCF 102 to update a policy data object at UDR 128.

PCF 102 updates the operatorSpecificData object and sends a PATCH message 402 to UDR 128. Upon successful commit, UDR 128 creates an updated ETag for the operatorSpecificData object and sends an OK message 404 including the updated ETag to PCF 102. PCF 102 then stores the updated ETag along with the operatorSpecificData.

Figure 5:
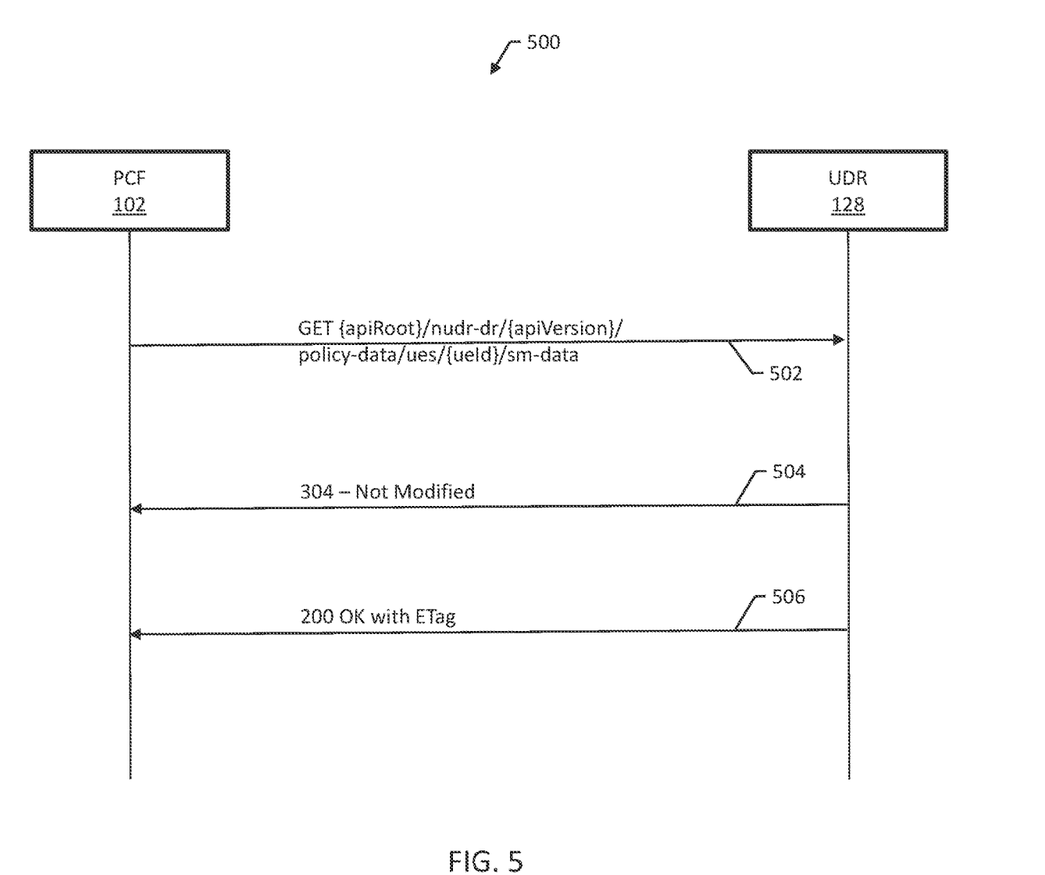
FIG. 5 is a ladder diagram illustrating an example message exchange for the PCF to check for synchronization with the UDR.

FIG. 5 is a ladder diagram illustrating an example message exchange 500 for PCF 102 to check for synchronization with UDR 128. Message exchange 500 could happen, for example, as part of regularly occurring checks conducted by PCF 102 or for PCF 102 to check if the data in its cache is still valid. For example, PCF 102 may have marked the data for deletion, and then later, if another process has not carried out the deletion, PCF 102 may check to see if the not-deleted data is still valid, i.e., still in sync with UDR 128. If so, PCF 102 can save computing and network resources by using the data in the cache.

PCF 102 fetches SM data by sending a GET request message 502 with If-None-Match set to the last known ETag for smPolicyData. UDR 128 compares the received ETag with the locally stored ETag and, if the ETag matches with the current context in UDR 128, then sends a response message 504 to indicate that the data has not been modified. PCF 102 can then determine that no change has occurred at UDR 128 and that PCF 102 is in sync with UDR 128 for smPolicyData.

If the received ETag does not match with the current context in UDR 128, then UDR 128 sends a response message 506 with the updated ETag and the updated data. PCF 102 stores the updated ETag along with the updated data.

Figure 6:
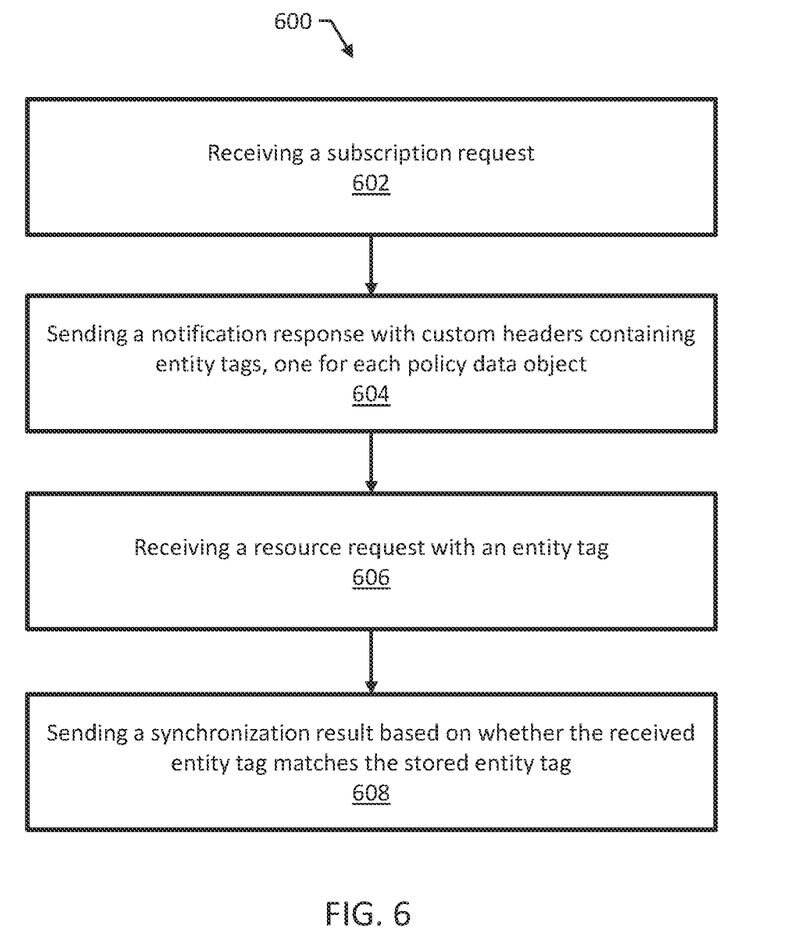
FIG. 6 is a flow diagram illustrating an example method for synchronization of policy data between network functions in a telecommunications network.

FIG. 6 is a flow diagram illustrating an example method 600 for synchronization of policy data between network functions in a telecommunications network. The method is performed by one or both of two network functions, e.g., a PCF and a UDR or any other appropriate network functions.

Method 600 includes receiving, at a first network function in the telecommunications network, a subscription request from a second network function (602). The subscription request specifies a subscription for updates to policy data objects maintained by the first network function. The policy data objects can include, e.g., AmPolicyData, SmPolicyData, UsageMonData, or any other appropriate type of data.

Method 600 includes sending, at the first network function, a notification response to the second network function (604). The notification response includes, for each policy data object of the plurality of policy data objects maintained by the first network function, a custom header including a respective entity tag for the policy data object.

Method 600 includes receiving, at the first network function, a resource request from the second network function (606). The resource request specifies a first policy data object and includes a first entity tag for the first policy data object. In some examples, the resource request from the second network function includes an HTTP GET request with If-None-Match set to the first entity tag for the first policy data object.

Method 600 includes sending, at the first network function, a synchronization result to the second network function (608). The synchronization result specifies whether the first entity tag for the first policy data object matches a stored entity tag for the first policy data object stored at the first network function.

In some examples, sending the synchronization result to the second network function includes comparing the first entity tag for the first policy data object with the stored entity tag for the first policy data object stored at the first network function. If the first entity tag for the first policy data object matches the stored entity tag for the first policy data object stored at the first network function, method 600 includes sending the synchronization result to indicate that the first policy data object has not been modified. If the first entity tag for the first policy data object does not match the stored entity tag for the first policy data object stored at the first network function, method 600 includes sending the synchronization result to indicate that the first policy data object has been modified and sending the stored entity tag to the second network function.

In some examples, method 600 includes, at the first network function, determining that one or more of the policy data objects maintained by the first network function have changed at the first network function and, in response, sending a notification message to the second network function. The notification message includes, for each of the one or more policy data objects that have changed at the first network function, a respective updated entity tag via a custom header for each of the notified policy data object.

In some examples, method 600 includes, at the first network function, receiving an update message from the second network function. The update message specifies a new value for at least one of the policy data objects. Method 600 includes, at the first network function, sending a notification message to the second network function, wherein the notification message includes, for each of the at least one of the policy data objects, an updated entity tag via a custom header for each of the notified policy data objects.

REFERENCES

The disclosure of each of the following references is incorporated herein by reference in its entirety.
1. $3^{rd}$ Generation Partnership Project; Technical Specification Group Core Network and Terminals; 5G System; Network Function Repository Services; Stage 3 (Release 17) 3GPP TS 29.510 V17.3.0 (2021-September)
2. $3^{rd}$ Generation Partnership Project; Technical Specification Group Core Network and Terminals; 5G System; Technical Realization of Service Based Architecture; Stage 3 3GPP TS 29.500 V15.0.0 (2018-July)

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for synchronization of policy data between network functions in a telecommunications network, the method comprising:
    receiving, at a first network function in the telecommunications network, a subscription request from a second network function, wherein the subscription request specifies a subscription for updates to a plurality of policy data objects maintained by the first network function;
    sending, at the first network function, a notification response to the second network function, wherein the notification response includes, for each policy data object of the plurality of policy data objects maintained by the first network function, a custom header including a respective entity tag (ETag) for the policy data object such that the custom header carries a plurality of ETags, including one ETag for each of the policy data objects;
    receiving, at the first network function, a resource request from the second network function, wherein the resource request specifies a first policy data object and includes a first ETag for the first policy data object; and
    sending, at the first network function, a synchronization result to the second network function, wherein the synchronization result specifies whether the first ETag for the first policy data object matches a stored ETag for the first policy data object stored at the first network function.

2. The method of claim 1, wherein the first network function is a unified data repository (UDR) and the second network function is a policy control function (PCF).

3. The method of claim 2, wherein the plurality of policy data objects includes one or more of: AmPolicyData, SmPolicyData, and UsageMonData.

4. The method of claim 1, wherein the resource request from the second network function comprises a hypertext transfer protocol (HTTP) GET request with an If-None-Match header carrying the first ETag for the first policy data object.

5. The method of claim 1, wherein sending the synchronization result to the second network function comprises:
    comparing the first ETag for the first policy data object with the stored ETag for the first policy data object stored at the first network function;
    when the first ETag for the first policy data object matches the stored ETag for the first policy data object stored at the first network function, sending the synchronization result to indicate that the first policy data object has not been modified; and
    when the first ETag for the first policy data object does not match the stored ETag for the first policy data object stored at the first network function, sending the synchronization result to indicate that the first policy data object has been modified and sending the stored ETag to the second network function.

6. The method of claim 1, comprising, at the first network function, determining that one or more of the policy data objects maintained by the first network function have changed at the first network function and, in response, sending a notification message to the second network function, wherein the notification message includes, for each of the one or more policy data objects that have changed at the first network function, a respective updated ETag via a custom header for each of the notified policy data object.

7. The method of claim 1, comprising, at the first network function, receiving an update message from the second network function, wherein the update message specifies a new value for at least one of the policy data objects, and wherein the method comprises, at the first network function, sending a notification message to the second network function, wherein the notification message includes, for each of the at least one of the policy data objects, an updated ETag via a custom header for each of the notified policy data object.

8. A system for synchronization of policy data between network functions in a telecommunications network, the system comprising:
    at least one processor and memory storing executable instructions for the at least one processor; and a first network function in the telecommunications network, wherein the first network function is implemented on the at least one processor and memory, and wherein the first network function is configured for:
receiving a subscription request from a second network function, wherein the subscription request specifies a subscription for updates to a plurality of policy data objects maintained by the first network function;
sending a notification response to the second network function, wherein the notification response includes, for each policy data object of the plurality of policy data objects maintained by the first network function, a custom header including a respective entity tag (ETag) for the policy data object such that the custom header carries a plurality of ETags, including one ETag for each of the policy data objects;
receiving a resource request from the second network function, wherein the resource request specifies a first policy data object and includes a first ETag for the first policy data object; and
sending a synchronization result to the second network function, wherein the synchronization result specifies whether the first ETag for the first policy data object matches a stored ETag for the first policy data object stored at the first network function.

9. The system of claim 8, wherein the first network function is a unified data repository (UDR) and the second network function is a policy control function (PCF).

10. The system of claim 9, wherein the plurality of policy data objects includes one or more of: AmPolicyData, SmPolicyData, and UsageMonData.

11. The system of claim 8, wherein the resource request from the second network function comprises a hypertext transfer protocol (HTTP) GET request with an If-None-Match header carrying the first ETag for the first policy data object.

12. The system of claim 8, wherein sending the synchronization result to the second network function comprises:
comparing the first ETag for the first policy data object with the stored entity tag ETag for the first policy data object stored at the first network function;
when the first ETag for the first policy data object matches the stored entity tag ETag for the first policy data object stored at the first network function, sending the synchronization result to indicate that the first policy data object has not been modified; and
when the first ETag for the first policy data object does not match the stored ETag for the first policy data object stored at the first network function, sending the synchronization result to indicate that the first policy data object has been modified and sending the stored ETag to the second network function.

13. The system of claim 8, wherein the first network function is configured for determining that one or more of the policy data objects maintained by the first network function have changed at the first network function and, in response, sending a notification message to the second network function, wherein the notification message includes, for each of the one or more policy data objects that have changed at the first network function, a respective updated ETag.

14. The system of claim 8, wherein the first network function is configured for:
receiving an update message from the second network function, wherein the update message specifies a new value for at least one of the policy data objects; and
sending a notification message to the second network function, wherein the notification message includes, for each of the at least one of the policy data objects, an updated ETag.

15. One or more non-transitory computer readable media having stored thereon executable instructions that when executed by at least one processor of a computer cause the computer to perform steps comprising:
receiving, at a first network function in a telecommunications network, a subscription request from a second network function, wherein the subscription request specifies a subscription for updates to a plurality of policy data objects maintained by the first network function;
sending, at the first network function, a notification response to the second network function, wherein the notification response includes, for each policy data object of the plurality of policy data objects maintained by the first network function, a custom header including a respective entity tag (ETag) for the policy data object such that the custom header carries a plurality of ETags, including one ETag for each of the policy data objects;
receiving, at the first network function, a resource request from the second network function, wherein the resource request specifies a first policy data object and includes a first ETag for the first policy data object; and
sending, at the first network function, a synchronization result to the second network function, wherein the synchronization result specifies whether the first ETag for the first policy data object matches a stored ETag for the first policy data object stored at the first network function.

16. The non-transitory computer readable media of claim 15, wherein the first network function is a unified data repository (UDR) and the second network function is a policy control function (PCF).

17. The non-transitory computer readable media of claim 16, wherein the plurality of policy data objects includes one or more of: AmPolicyData, SmPolicyData, and UsageMonData.

18. The non-transitory computer readable media of claim 15, wherein the resource request from the second network function comprises a hypertext transfer protocol (HTTP) GET request with an If-None-Match header carrying the first ETag for the first policy data object.

19. The non-transitory computer readable media of claim 15, wherein sending the synchronization result to the second network function comprises:
comparing the first ETag for the first policy data object with the stored ETag for the first policy data object stored at the first network function;
when the first ETag for the first policy data object matches the stored ETag for the first policy data object stored at the first network function, sending the synchronization result to indicate that the first policy data object has not been modified; and
when the first ETag for the first policy data object does not match the stored ETag for the first policy data object stored at the first network function, sending the synchronization result to indicate that the first policy data object has been modified and sending the stored ETag to the second network function.

20. The non-transitory computer readable media of claim 15, the steps comprising, at the first network function, determining that one or more of the policy data objects maintained by the first network function have changed at the first network function and, in response, sending a notification message to the second network function, wherein the notification message includes, for each of the one or more policy data objects that have changed at the first network function, a respective updated ETag.

\* \* \* \* \*

UNITED STATES PATENT AND TRADEMARK OFFICE
CERTIFICATE OF CORRECTION

| | | |
|---|---|---|
| PATENT NO. | : 12,267,793 B2 | Page 1 of 1 |
| APPLICATION NO. | : 17/748793 | |
| DATED | : April 1, 2025 | |
| INVENTOR(S) | : Krishan et al. | |

It is certified that error appears in the above-identified patent and that said Letters Patent is hereby corrected as shown below:

In the Specification

In Column 5, Line 45, delete "some" and insert -- home --, therefor.

In the Claims

In Column 13, Line 41, in Claim 12, delete "entity tag ETag" and insert -- ETag --, therefor.

In Column 13, Line 44, in Claim 12, delete "entity tag ETag" and insert -- ETag --, therefor.

Signed and Sealed this
Seventeenth Day of June, 2025

Coke Morgan Stewart
*Acting Director of the United States Patent and Trademark Office*